United States Patent [19]

DePierri et al.

[11] Patent Number: 5,396,021
[45] Date of Patent: Mar. 7, 1995

[54] DEACTIVATION OF DRIER MATERIAL FOR OLEFIN REACTIONS

[75] Inventors: William G. DePierri, Baton Rouge; Michael F. McDonald, Jr., Greenwell Springs; Albert E. Schweizer, Baton Rouge, all of La.

[73] Assignee: Exxon Chemical Products Inc., Linden, N.J.

[21] Appl. No.: 949,657

[22] Filed: Sep. 23, 1992

[51] Int. Cl.$^6$ ................................................ C07C 7/13
[52] U.S. Cl. ...................................... 585/826; 585/824
[58] Field of Search ................................. 585/824, 826

[56] References Cited

U.S. PATENT DOCUMENTS

| | | | |
|---|---|---|---|
| 3,420,772 | 1/1969 | Convent et al. | 585/826 |
| 3,812,200 | 5/1974 | Grey et al. | 502/55 |
| 4,043,938 | 8/1977 | Reif et al. | 585/826 |
| 4,962,272 | 10/1990 | Cullo et al. | 585/826 |

OTHER PUBLICATIONS

Sheivdaev, A. G. et al, "Results of the Industrial Testing of Zeolites in the Production of Butyl Rubber", Absorbenty, Ikh Poluch, Svoistva Primen, Tr. Vses. Soveshch. Adsorbentam, 3rd, 212–215 (1971).

*Primary Examiner*—Joseph L. Schofer
*Assistant Examiner*—Tom Weber
*Attorney, Agent, or Firm*—Myron B. Kurtzman; John E. Schneider

[57] ABSTRACT

A process for reducing the loss of monomers from a polymerization recycle stream comprising steam treating a molecular sieve used to dry the recycle stream to remove acidic sites within the sieve. The steam treatment is conducted at a temperature of between 150° C. and 300° C. for 2 to 24 hours.

3 Claims, No Drawings

DEACTIVATION OF DRIER MATERIAL FOR OLEFIN REACTIONS

The invention relates to a method for removing impurities from regenerated molecular sieves used to dry recycled solvent streams for olefinic polymerization. More specifically, it relates to the use of dry steam to clean the sieves of decomposition products.

BACKGROUND OF THE INVENTION

In olefinic polymerization reactions, it is very important that the recycled solvents employed be free of water. This is particularly true in the production of butyl rubber.

Several different methods have been used to dry the solvents and reactants. One particularly useful method is to pass the solvents and monomers through a molecular sieve, such as a Zeolite bed to remove the water present. See Sheivdaev, A. G., et al., "Results of the Industrial Testing of Zeolites in the Production of Butyl Rubber," Absorbenty, Ikh Poluch., Svoistva Primen., Tr. Vses. Soveshch. Adsorbentam, 3rd, 212-15(1971).

While these molecular sieves are very effective in reducing the water present in the recycle stream, it was found that after extended use, an oil deposit forms in the bed. This deposit forms from small amounts of olefins and diolefins present in the solvent stream, causing a loss of these olefin valves. In addition, if these deposits continue to form, they begin to interfere with the capacity of the molecular seive to remove water from the solvent. Regeneration of the molecular sieve using conventional methods (e.g. heating the material at 250° C. for 8 to 16 hours) does not eliminate the problem. In fact, it has been observed that the loss of olefins from the solvent is greater for regenerated molecular sieves than it is for fresh sieves.

It is believed that some acidic sites have been formed on the sieve from decomposition of some of the methyl chloride solvent, either during the dehydration of the solvent or while the sieve is heated to desorb the water. These acidic sites then catalyze polymerization of the monomers present in the recycle stream. This belief is supported by analysis of the residue found in the beds, which showed that the residue contained mostly isobutylene trimer.

While fresh zeolite can be used each time, this alternative is not cost effective. Therefore, a need exists to purge regenerated molecular sieves of the solvent decomposition products.

SUMMARY OF THE INVENTION

It has recently been discovered that by subjecting a regenerated drying molecular sieve to dry steam before it is placed into operation, a significant reduction in monomer loss residue build-up can be achieved. By varying such variables as the temperature of the steam, the pressure, of the steam and the duration of the treatment, either alone or in combination, it is possible to restore a drying molecular sieve to the same efficiency as a fresh molecular sieve.

DETAILED DESCRIPTION OF THE INVENTION

The invention is directed to the use of steam to purge impurities from drying molecular sieves used to remove water from recycle solvent streams. It is particularly useful in removing such impurities from zeolite molecular sieves used to dry the methyl chloride recycle stream in the production of isobutylene based polymers such as Butyl Rubber and isobutylene paramethylstyrene copolymer. As discussed above, it has been discovered that, especially for regenerated drying molecular sieves, some acidic sites are formed, and the small amount of olefins in the solvent are then rapidly reacted by these acidic sites causing loss of the olefin valves, and fouling of the seive bed.

By "drying molecular sieve" is meant a molecular sieve, such as a zeolite bed, which is commonly used to remove water from polymerization recycle streams. Molecular sieves typically used for this purpose include zeolites of the structure-type LTA (in the $Na^+$ cation form, this is commonly called Molecular Sieve 4A, in the $K^+$ cation form this is commonly known as Molecular Sieve 3A, for example), zeolites of the structure-type ERI and OFF and the intergrowths of these structure-types, zeolites of the structure-type FER, zeolites of the structure-type MOR, zeolites of the structure-type HEU, zeolites of the structure-type DAC, and zeolites of the structure-type EPI. These can be mineral zeolites, naturally occurring zeolite materials, or they can be synthetic zeolites.

Molecular sieves can be regenerated allowing them to be reused several times. This regeneration is usually accomplished by heating the sieves to a temperature of between 200° to 350° C. for 4 to 24 hours to drive off the water absorbed by the sieve. This regeneration process, however, has been found to be ineffective in eliminating the build-up of acidity. In fact, as noted above, the acidity appears to be worse for regenerated molecular sieves.

Acidity build-up and residue build-up can be reduced or eliminated by steam treating the drying molecular sieve after it has been regenerated. "Dry" steam is used to prevent the introduction of water into the sieve.

Steam is introduced into the molecular sieve by adding the steam flow to the usual purge gas flow through the bed. The steam can be at a temperature of between 150° C. to 350° C. with 230° C. being preferred. Water partial pressure of the steam should be between 1 to 75 psia with 6.0 psia being preferred. The treatments should run from 5 to 24 hours, with 10 to 15 hours preferred for a typical bed. The time should be as short as possible while still lowering the acidity of the bed. It is well known in the art that too severe a steam treatment will destroy the zeolite bed. The actual pressures, temperatures and duration will, of course, vary depending on the amount of the acidic material on the bed, the size of the molecular sieve and the actual molecular sieve used.

The following Examples illustrate the effectiveness of the present invention.

In the Examples the drying molecular sieve used was extrudates of the zeolite structure-type HEU. The molecular sieve was placed in a drying bed as part of a recycle stream for a typical butyl polymerization reactor The recycle stream comprised 96.374 wt % methyl chloride, 0.092 wt. % isoprene and 3.421 wt. % isobutylene.

Several experiments were conducted using a fresh molecular sieve, regenerated molecular sieve without steam treatment and regenerated molecular sieves with the steam treatment described below.

Regeneration of the beds was accomplished by purging with dry nitrogen vapor, while heating the bed to 230° C., holding at 230° C. for four hours to drive off the majority of the sorbed water, then adding to the purge gas steam at from 1 psia to 15 psia for the desired time, one to seven hours. At the end of this time, the steam was blocked out of the purge gas, and the nitrogen was left flowing while the bed was cooled from 230° C. to the operating temperature.

EXAMPLE I

A series of recycle runs were conducted using a drying bed containing fresh molecular sieve (Run 1), a molecular sieve which had been regenerated once using the procedure outlined above (Run 2) and a molecular sieve which had been regenerated twice (Run 3). As seen from the data presented in Table 1, a significant amount of monomer was lost from the recycle stream when regenerated beds were used. In addition, physical examination of the drying beds showed the presence of an oily residue in the beds.

These runs were for comparative purposes and do not reflect the method of the invention.

EXAMPLE II

A series of runs were conducted using regenerated drying beds which had been subjected to steam treatments as described above.

In the first of the Runs (Run 4) the sieve was subjected to steam treatment 230° C. at 1.7 psia for three hours. In Run 5, a pressure of 15 psia was used for one hour and in Run 6, a pressure of 15 psia was used for 7 hours. As seen from the data in Table 1, monomer loss was significantly reduced by steam treating the molecular sieve. The best results were achieved by treating the sieve for 7 hours at 15 psia. The monomer loss rate was almost the same for this bed as it was for the fresh bed in Run 1.

The molecular sieves treated with steam were also evaluated to determine their water absorption capacity. Static absorption measurements indicated that the steam treatments had no effect on the sieve's capacity and there was no loss of crystallinity.

TABLE 1

| Run No. | MeCl | Iso-butylene | Isoprene | Olefin Loss (%) Iso-butylene | Isoprene |
|---|---|---|---|---|---|
| Initial Feed | 96.347 | 3.421 | 0.092 | | |
| 1 | 96.441 | 3.392 | 0.081 | 1.97 | 11.96 |
| 2 | 96.839 | 2.804 | 0.012 | 15.71 | 86.96 |
| 3 | 92.900 | 1.721 | 0.000 | 48.26 | 100.0 |
| Run 4 | | | | | |
| Initial Feed | 96.498 | 3.343 | 0.089 | — | — |
| After 3 Hours | 96.787 | 3.027 | 0.024 | 9.45 | 73.03 |
| Run 5 | | | | | |
| Initial Feed | 96.427 | 3.412 | 0.096 | — | — |
| After 3 Hours | 96.503 | 3.319 | 0.076 | 2.71 | 20.83 |
| Run 6 | | | | | |
| Initial Feed | 96.407 | 3.455 | 0.083 | — | — |
| After 3 Hours | 96.462 | 3.371 | 0.076 | 2.4 | 8.4 |

What we claim is:

1. A method of preventing olefin monomer polymerization from a regenerated molecular sieve when drying an olefin containing polymerization solvent recycle stream said method comprising steam treating the previously regenerated seive with steam for a sufficient time at a temperature between about 150° C. to about 300° C. and sufficient water partial pressure to remove potential polymerization sites.

2. The method of claim 1 wherein said water partial pressure ranges from about 1.0 to 75 psia.

3. The method of claim 1 wherein said time ranges from about 2 hours to about 24 hours.

* * * * *

UNITED STATES PATENT AND TRADEMARK OFFICE
CERTIFICATE OF CORRECTION

PATENT NO. : 5,396,021
DATED : March 7, 1995
INVENTOR(S) : William G. DePierri, Michael F. McDonald, Jr., Albert E. Schweizer It is certified that error appears in the above-indentified patent and that said Letters Patent is hereby corrected as shown below:

Title page, Assignee: delete the name 'Exxon Chemical Products, Inc.," and replace with - - - Exxon Chemical Patents, Inc., - - -

Signed and Sealed this

Twenty-fourth Day of October, 1995

Attest:

BRUCE LEHMAN

Attesting Officer

Commissioner of Patents and Trademarks